United States Patent [19]
Watanabe et al.

[15] 3,670,082
[45] June 13, 1972

[54] METHOD OF CONTROLLING RICE BLAST AND SHEATH BLIGHT DISEASE WITH 3,4-DICHLORO-6-HYDROXYIMINOMETHYLPYRIDAZINE-1-OXIDE

[72] Inventors: Yoshihachi Watanabe, Koga-gun; Masaru Ogata, Kobe, both of Japan

[73] Assignee: Shionogi & Co., Ltd., Asaka, Japan

[22] Filed: Oct. 21, 1970

[21] Appl. No.: 82,812

Related U.S. Application Data

[63] Continuation-in-part of Ser. No. 743,950, July 11, 1968, abandoned.

[30] Foreign Application Priority Data

July 11, 1967 Japan....................................42/44825

[52] U.S. Cl...............................424/250, 424/171, 424/357

[51] Int. Cl. .........................................................A01n 9/22
[58] Field of Search...................................................424/250

[56] References Cited

UNITED STATES PATENTS 3,547,617  12/1970  Tamura et al.........................424/250

OTHER PUBLICATIONS

Ogata Chemical Abstracts, 1964, Vol. 61. pp. 4,341–4,342

Primary Examiner—Albert T. Meyers
Assistant Examiner—Dale R. Ore
Attorney—Wenderoth, Lind & Ponack

[57] ABSTRACT

A method of preventing and controlling a rice blast disease and sheath blight disease which comprises applying thereto as an active ingredient 3,4-dichloro-6-hydroxyiminomethylpyridazine 1-oxide.

2 Claims, No Drawings

METHOD OF CONTROLLING RICE BLAST AND SHEATH BLIGHT DISEASE WITH 3,4-DICHLORO-6-HYDROXYIMINOMETHYLPYRIDAZINE-1-OXIDE

The present application is a continuation-in-part of application Ser. No. 743,950, filed July 11, 1968, now abandoned.

This invention relates to an agricultural fungicidal composition containing as an active ingredient 3,4-dichloro-6-hydroxyiminomethylpyridazine 1-oxide:

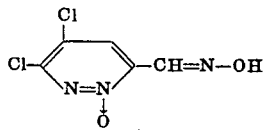

More particularly, the invention is concerned with the use of 3,4-dichloro-6-hydroxyiminomethylpyridazine 1-oxide, advantageously in the form of an agricultural fungicidal composition of which it constitutes the principal active ingredient, for controlling rice blast disease and sheath blight disease.

The compound, the active ingredient on which the present invention is based, was synthesized by the present inventor by reacting 3-chloro-4-nitro-6-methylpyridazine 1-oxide with acetylchloride, as was reported in the Chemical Pharmaceutical Bulletin (Japan), Vol. 11, 1,511 – 1,516 (1963). Compound is easily soluble in alkali, it melts at 234° C (with decomposition).

The activity of the compound is demonstrated by the following test data:

Test 1

Controlling effect of compound on rice blast disease

Seedlings of the variety Aichiasahi in the two-leaf stage which had germinated at 28° C were planted on paddy soil in Wagner pot 20 cm. in diameter. A pot held 30 seedlings. These seedlings were grown in the greenhouse for 30 days after transplanting.

Spores of rice blast fungus for inoculation were formed on a slant agar culture medium (rice straw decoction) for 10 days. The rice plants were inoculated with spore suspension of 40 ml. per pot. The inoculated plants were held in a moist room with saturated moisture at 28°– 30° C for 20 – 24 hours. The infected leaves of rice plants were treated with the spray method after inoculation for 20 – 24 hours at concentration of 600 ppm of the compound (75 ml. per pot). These plants were held in the greenhouse at 28° C for 7 days.

The number of small or well developed necrotic lesions as to the investigation of the controlling effect was counted for 100 leaves per pot.

The rates of the controlling effect were calculated by the percent disease control.

Percent disease control = $(A - B)/A \times 100$

A = Number of lesions of untreated check

B = Number of lesions of treatment

TABLE 1.—CONTROLLING EFFECTS OF COMPOUND ON RICE BLAST

| Compound | Concentration, p.p.m. | Number of lesions per 100 leaves | Percent disease control |
|---|---|---|---|
| Present compound | 600 | 28 | 80.2 |
| EDDP | 500 | 13 | 90.8 |
| PMA | 40 | 11 | 92.2 |
| Untreated check | — | 142 | 0 |

Note.—EDDP: O-ethyl-S,S-diphenyl-N-dithiophosphate. PMA: Phenylmercuric acetate.

TEST 2

Controlling effect of compound on sheath blight disease

Seedlings of the variety Aichiasahi in the two-leaf stage which had germinated at 28° C were planted on paddy soil in Wagner pot 20 cm. in diameter. Four seedlings per part were planted at four parts per pot. The rice plants were grown in the greenhouse for 50 days after transplanting.

Mycelia of sheath blight for inoculation were grown on a plate agar culture medium (rice straw decoction) at 28° C for 2 days. Rice sheaths of four stems per hill (four hills per pot) were inoculated with mycelia of sheath blight that were grown at 28° C for 2 days. The inoculated plants were held in a moist room with saturated moisture at 28°– 30° C for 20 – 24 hours. After inoculation, 75 ml. of compound solution (600 ppm) were treated with the spray method on stems and sheaths of rice plants. These plants were held in a moist room at 28° C for 4 days. After holding for 4 days under conditions of high humidity, these treated plants were placed in a greenhouse at 28° C for 5 days.

The investigation of the controlling effect of the compound on sheath blight disease was carried out by counting the number of newly infected sheaths from the inoculated sheaths.

Percent disease control = $(A - B)/A \times 100$

A = Number of infected sheaths of untreated check — number of inoculated sheaths B = Number of infected sheaths of treatment — number of inoculated sheaths

TABLE 2.

Controlling effects of compound on sheath blight

| Compound | Concentration ppm | Percent inoculation infection | Number of newly infected sheath | Percent disease control |
|---|---|---|---|---|
| Present Compound | 600 | 100 | 19 | 87.5 |
| MAFA | 42 | 100 | 20 | 83.3 |
| Untreated check | — | 100 | 40 | 0 |

MAFA: Ferric ammonium methylarsonate

Table 1 shows that the present compound has good therapeutic effect upon rice blast. The therapeutic effect of the compound is somewhat inferior to PMA and EDDP.

From the results shown in Table 2, the present compound is good effective on sheath blight. The therapeutic effect of the compound is equivalent to or superior to MAFA.

Thus, from the above results and with reference to common amounts of EDDP, PMA and MAFA, an effective amount of the present compound is decided to be between 150 – 300 grams per 10 acres.

As for the purpose, the present compound can be formulated by admixing with any desired liquid or solid carrier such as the finely divided solid carriers which are preferably of large surface area, such as clay, Fuller's earth, talc, bentonite, kieselguhr, diatomaceous earth, etc. Non-clay carriers which can be formulated with the active material include, for example, sulfur, volcanic ash, calcium carbonate, lime, by-product lignin, flour such as wood flour, wheat soybean flour, etc.

For spray application, the active ingredient can be dissolved or dispersed in a liquid carrier. Examples of liquid carriers are water, various oils and various solvents such as kerosene, fuel oil, lubricating oil, soybean oil, linseed oil, castor oil, etc. If desired, the active ingredient can be available in admixture with other fungicides, insecticides, herbicides, fertilizers, etc.

The following examples illustrate presently preferred production of examplary embodiments of compositions of this invention. Percentages are by weight.

EXAMPLE 1

Two grams of 3,4-dichloro-6-hydroxyiminomethylpyridazine 1-oxide are admixed with 98 grams of talc and the admixture is well pulverized and mixed to obtain powders having 2 percent of the active ingredient.

EXAMPLE 2

A mixture of 3 percent of 3,4-dichloro-6-hydroxyiminomethylpyridazine 1-oxide, 3 percent of sodium ligninsulfonate, 2 percent of sodium laurylsulfonate, 70 percent of kerosene and 20 percent of water is well homogenized to obtain an emulsion.

EXAMPLE 3

Sufficient water is added to a mixture of 10 percent of 3,4-dichloro-6-hydroxyiminomethylpyridazine 1-oxide, 66 percent of diatomaceous earth, 20 percent of dextrine, 3 percent of sodium ligninsulfonate and 1 percent of kerosene to make a paste, which is converted into granule form according to a per se conventional method, the final granules being essentially water-free.

What is claimed is:

1. A method of controlling sheath blight disease and rice blast disease in rice plants, cause by Piricularia oryzae and Pellicularia sasakii, which comprises applying to said rice plants a fungicidally effective amount of 150 to 300 grams per 10 acres of 3,4-dichloro-6-hydroxyiminomethylpyridazine 1-oxide.

2. A method according to claim 1 in which the active ingredient is applied to a rice plant in a carrier selected from the group consisting of inert liquid carrier or inert solid carrier.

* * * * *